United States Patent [19]
Lary

[11] Patent Number: 5,350,144
[45] Date of Patent: Sep. 27, 1994

[54] MOUNTING FIXTURE FOR A HAND-HELD HAIR DRYER

[76] Inventor: Fredric C. Lary, 2022 Ridge Rd., Muttontown, N.Y. 11791

[21] Appl. No.: 106,221

[22] Filed: Aug. 13, 1993

[51] Int. Cl.⁵ .............................................. F16M 11/12
[52] U.S. Cl. ................................... 248/183; 248/316.1
[58] Field of Search ............ 248/183, 176, 187, 309.1, 248/313, 316.1, ; 34/99, 96, 101

[56] References Cited

U.S. PATENT DOCUMENTS

| | | |
|---|---|---|
| 926,114 | 6/1909 | Hall . |
| 2,441,734 | 5/1948 | Van Hyning ..................... 248/230 |
| 4,220,311 | 9/1980 | Wolff ................................. 248/645 |
| 4,225,106 | 9/1980 | Eplan ............................. 248/314 X |
| 4,878,644 | 11/1989 | Downing .......................... 248/674 |
| 4,910,385 | 3/1990 | Shye-Long ....................... 34/96 X |
| 4,998,698 | 3/1991 | Martinson ........................ 248/176 |

FOREIGN PATENT DOCUMENTS 0967301 10/1950 France .
0975673  3/1951 France .

*Primary Examiner*—Ramon O. Ramirez
*Attorney, Agent, or Firm*—Morgan & Finnegan

[57] ABSTRACT

A mounting fixture for a hand-held hair dryer comprising a fixture body including a base portion having a support surface, and an arm portion extending from the support surface in a direction generally perpendicular to the support surface. A bridge member is supported on the arm portion. The bridge member has a longitudinal axis which is parallel to and spaced apart from the support surface. The mounting fixture includes a clasp mounted on the support surface to receive and secure the end of the handle of a hair dryer and a clamp connected to the bridge member for holding the barrel of the hair dryer against the bridge member.

14 Claims, 4 Drawing Sheets

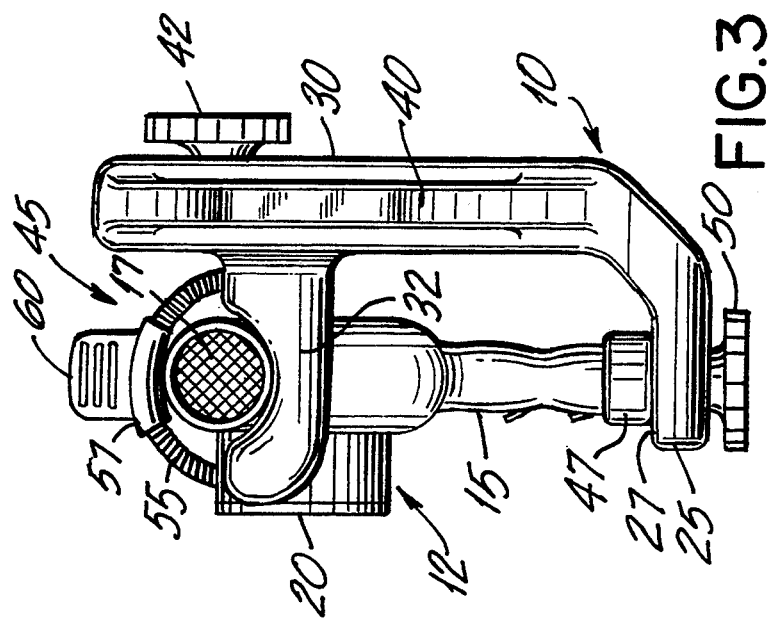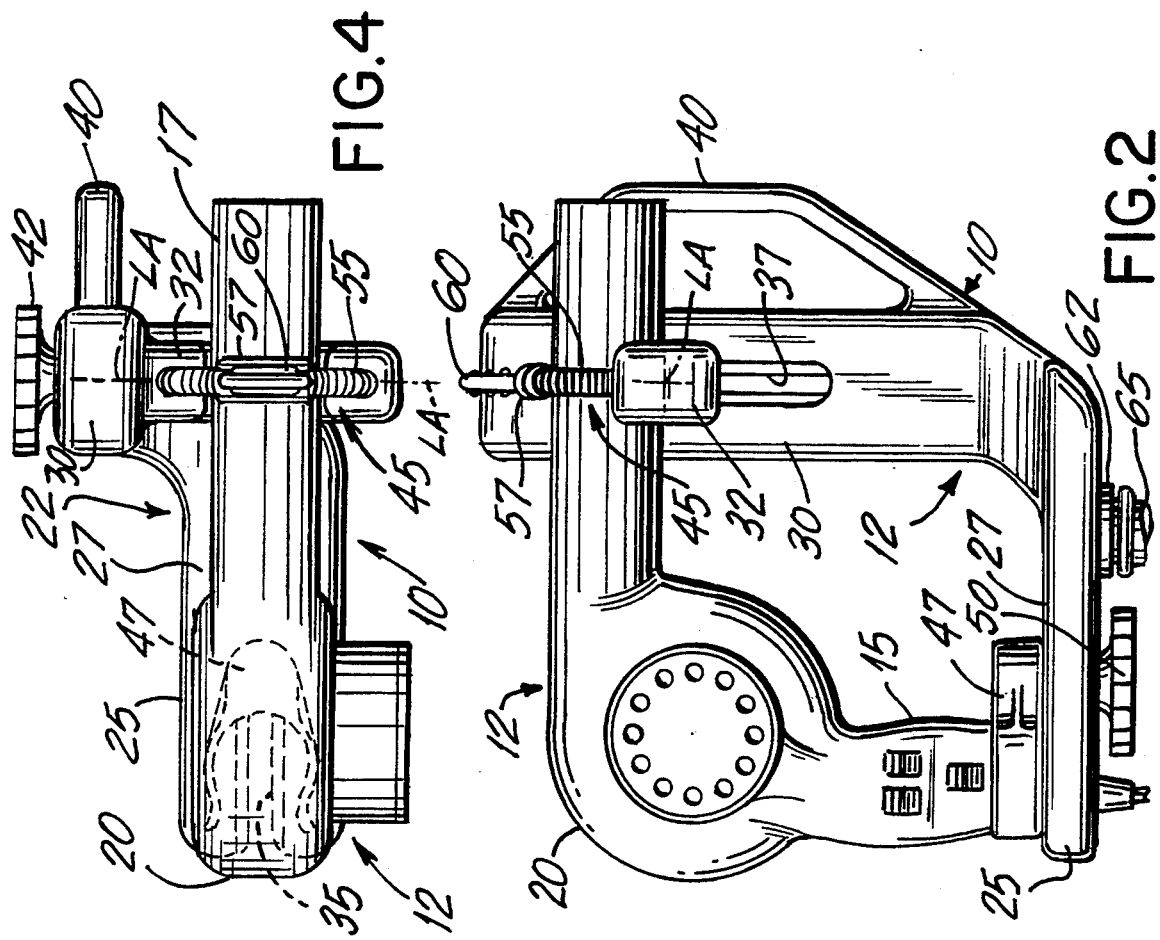

MOUNTING FIXTURE FOR A HAND-HELD HAIR DRYER

BACKGROUND OF THE INVENTION

1. Field of the Invention

This invention relates to a mounting fixture for a hair dryer, and more particularly to a mounting fixture for mounting a hand-held hair dryer on a support member such as a stand enabling hands-free use of the hand-held hair dryer.

2. Related Art

Portable, hand-held electric hair dryers are known. Such hair dryers have a barrel portion from which warm air exits. The operator holds the hair dryer by a handle portion oriented in a perpendicular direction with respect to the barrel portion. The operator directs the barrel portion toward the damp hair so that the warm air impinges on it. Thus, one hand of the operator must be occupied by holding the hair dryer during its use.

Large, commercial hair dryers fixed to stands are also known. Such hair dryers are typically found in the studios of professional hair stylists. These commercial hair dryers typically have a housing with a concave inner surface which is open at its bottom. The person whose hair is to be dried typically sits in a chair and the hair dryer is positioned so that the hair dryer covers a substantial portion of the person's head so that the person's hair is adjacent to the concave inner surface. The support structure of the hair dryer maintains the hair dryer in this position without the hair dryer being held by the stylist.

When in use, the inner surface of the commercial hair dryer is ordinarily spaced sufficiently close to the person's head to prevent access to the hair being dried by either the hair stylist or the person. Thus, styling of the person's hair, while it is being dried by large, commercial hair dryers, is very difficult.

The commercial hair dryers are usually large and heavy, and are intended to remain stationary, except for the relatively small movements required to position the hair dryer over a person's head. Commercial hair dryers are not compact or portable. As a result, such hair dryers ordinarily cannot be carried in a suitcase, or stored on the shelf of a bathroom cabinet, in the manner of a hand-held hair dryer.

SUMMARY OF THE INVENTION

The present invention provides a hair dryer mounting fixture for a hand-held hair dryer having an elongate dryer handle and barrel extending from a central portion. The dryer handle and barrel have a perpendicular orientation with respect to one another.

The mounting fixture comprises a fixture body including a base portion having a support surface, and an arm portion extending from the support surface in a plane generally perpendicular to the support surface. The arm portion includes a built-in handle for easy adjustment of the fixture. A bridge member is supported on the arm portion. The bridge member has a longitudinal axis which is generally parallel to the support surface. The bridge member is spaced apart from the support surface and is designed to support the barrel of the hand-held hair dryer.

The mounting fixture includes a clasp mounted on the support surface. The clasp is adapted to receive the end of the dryer handle and to impede displacement of the dryer handle relative to the bridge member. The mounting fixture further comprises a clamp connected to the bridge member for holding the dryer barrel thereagainst when the dryer barrel extends across the bridge member. As a result, when the end of the dryer handle is inserted into the clasp, the dryer barrel is held against the bridge member by the clamp.

The advantages of the hair dryer mounting fixture are numerous. For example, since the hair dryer does not surround the person's head, accessibility to the hair being dried by either the person or hair stylist is facilitated. Also, the hair dryer does not have to be held during use since it is supported by the mounting fixture. Thus, the hand which would otherwise be used to hold the dryer is free to assist with styling of the hair while the hair is being dried. This feature is particularly useful to a person who is unable to hold the dryer because of, for example, injury or handicap. Further, because the hair dryer can be removed from the mounting fixture, the advantages of a hand-held hair dryer (portability and compact construction) are not lost. In addition, the hair dryer mounting fixture is adjustable so that it can be used with the vast majority of hand-held hair dryers currently being marketed.

These and other features and advantages of the invention will be more fully understood from the following Description of the Preferred Embodiments together with the accompanying drawings.

BRIEF DESCRIPTION OF THE DRAWINGS

FIG. 2 is a side elevation view of the mounting fixture of FIG. 1;

FIG. 3 is a front end elevation of the mounting fixture of FIG. 1;

FIG. 4 is a top plan view of the mounting fixture of FIG. 1 showing, in hidden lines, the slot in the base portion and clasp;

Corresponding reference characters indicate corresponding parts throughout the several views of the drawings.

DESCRIPTION OF THE PREFERRED EMBODIMENTS

Figure 1:
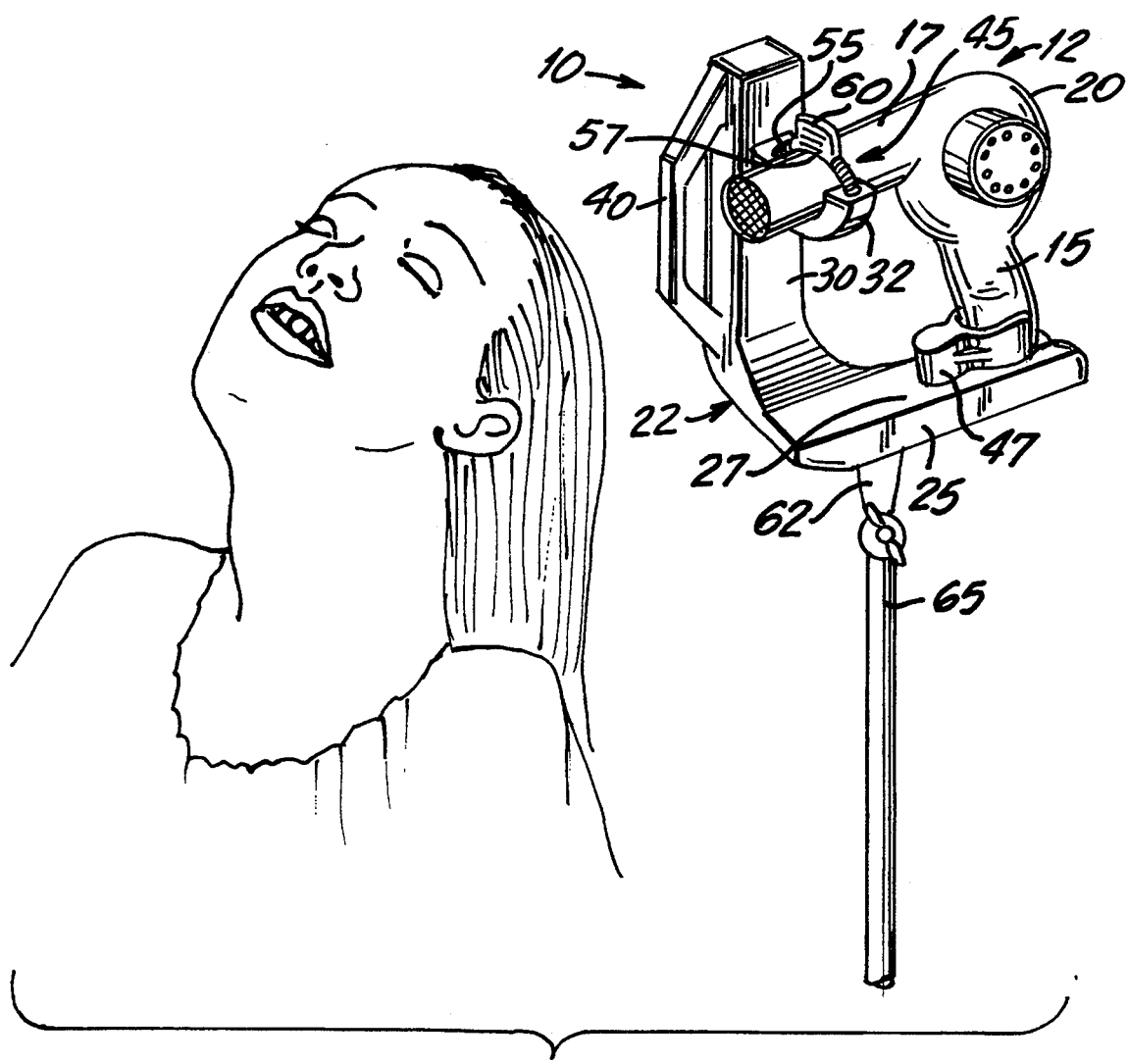
FIG. 1 is a perspective view of a preferred embodiment of the present invention showing a hand-held hair dryer mounted on the mounting fixture and the mounting fixture supported on a support member.

Referring to the drawings in detail, numeral 10 refers to a hair dryer mounting fixture for a hand-held hair dryer 12. The hair dryer 12 has an elongate dryer handle 15 and an elongate barrel 17. The dryer handle 15 and barrel 17 have a generally perpendicular orientation with respect to one another.

Briefly, the mounting fixture 10 comprises a fixture body 22 preferably formed by injection molding. Fixture body 22 includes a base portion 25 having a generally flat support surface 27. The fixture body 22 further includes an arm portion extending from the support surface 27 in a plane generally perpendicular to the support surface.

The fixture body 22 includes a bridge member 32 also preferably formed by injection molding. The bridge member 32 is supported on the arm portion 30 and has a longitudinal axis (line L-A in FIGS. 2 and 4) which is parallel to the support surface 27. The bridge member 32 supports the dryer barrel 17.

More specifically, the base portion 25 has a slot 35 extending in a perpendicular direction relative to the longitudinal axis of bridge member 32. The arm portion 30 includes a slot 37 having an axis generally perpendicular to the support surface 27. The arm portion 30 further includes an integral handle portion 40 for adjusting the orientation of the fixture.

The bridge member 32 is supported on the arm portion 30 so that the bridge member is spaced apart from the support surface 27. The bridge member 32 is slidably mounted in the slot 37 for translation therein.

Bridge member 32 comprises an externally threaded stud extending from the bridge member through the slot 37 and a knob 42 having internal threads corresponding to the threads on the stud for securing the bridge member 32 in a plurality of positions in the slot 37. Turning the knob 42 in one direction causes the knob 42 to move toward the bridge member 32, and to eventually clamp the bridge member against the arm portion 30. Turning the knob 42 in the opposite direction causes the knob 42 to move away from the bridge member 32, eventually loosening the bridge member from the arm portion 30 allowing the bridge member to be re-positioned along the slot 37.

The mounting fixture 10 further comprises a clasp 47 also preferably formed by injection molding. The clasp 47 is mounted on the support surface 27 and has a U-shape, with the ends of the clasp facing away from bridge member 32. The legs of the U-shaped clasp 47 preferably have concave inner surfaces.

The U-shape of clasp 47 facilitates insertion of the end of the dryer handle 15 into the clasp. The U-shape of the clasp 47 also impedes movement of the dryer handle 15. The concave inner surfaces of the legs of the U-shaped clasp 47 enable the legs to partially encircle the dryer handle 15 to further impede its movement.

The clasp 47 is slidably mounted in the slot 35 for translation therein. The clasp 47 further comprises an externally threaded stud extending from the clasp through the slot 35 and a knob 50 having internal threads corresponding to the threads on the stud for clamping the clasp 47 in the slot 35. Turning the knob 50 in one direction causes the knob 50 to move toward the clasp 47, eventually securing the clasp against the base portion 25. Turning the knob 50 in the opposite direction causes the knob 50 to move away from the base portion 25, eventually loosening the clasp from the base portion 25 allowing the clasp to be re-positioned along the slot 35.

The clamp 45 includes a resilient strap 55 which preferably comprises a helical spring attached to opposite ends of the bridge member 32 so that when the dryer barrel 17 is inserted between the strap 55 and bridge member 32, the strap 55 urges the dryer barrel 17 against the bridge member 32.

The clamp 45 further comprises an elastomeric portion including an elastomeric sleeve 57 coaxially surrounding a portion of the strap 55. The elastomeric sleeve 57 includes an integral tab 60. When the strap 55 holds the dryer barrel 17 against the bridge member 32, the sleeve 57 is urged against the dryer barrel 17 by the strap 55 to frictionally resist movement of the dryer barrel 17 with respect to bridge member 32.

The elastomeric portion of the clamp 45 may take other forms as long as it is forceably sandwiched between the clamp 45 and dryer barrel 17 to force the dryer barrel against the bridge member 32. This forceable engagement between the elastomeric portion and dryer barrel 17 causes frictional resistance to movement of the dryer barrel 17 relative to the bridge member 32. Thus, the elastomeric portion can be used effectively with a nonresilient clamp 45 if the elastomeric portion is forced against the dryer barrel 17 by the clamp to produce the frictional resistance.

The hair dryer 12 is mounted on the fixture by first adjusting the dimension between the bridge member 32 and base portion 25 to be equal to the distance between the end of the dryer handle 15 and the axis of the dryer barrel 17. The dimension between the clasp 47 and arm portion 30 is then adjusted to be less than the distance between the end of the dryer barrel 17 and the axis of the dryer handle 15.

The end of the dryer barrel 17 is then inserted through the space between the strap 55 and bridge member 32 with the end of the dryer handle 15 in light contact with the support surface 27. The space between the strap 55 and bridge member 32 can be enlarged by pulling the integral tab 60, and the associated strap 55, away from the bridge member 32 to facilitate the insertion.

Continued insertion of the dryer barrel 17 between the strap 55 and bridge member 32 eventually results in the end of the dryer handle 15 passing between the two ends of clasp 47 and becoming lodged in the clasp. Thus, with the end of the dryer handle 15 held in the clasp 47 and the dryer barrel 17 held against the bridge member 32 by the clamp 45, the hair dryer 12 is held in a stationary position with respect to the fixture body 22.

The base portion 25 is supported on a pivoting joint 62, such as a ball within a socket. The pivoting joint 62 enables adjustment of the inclination of the fixture body 22, thereby enabling adjustment of the direction of the dryer barrel 17. The pivoting joint 62 is mounted on a support member 65 which can be supported by a tripod 67 or a base such as those used in floor lamps.

The support member 65 may alternatively be supported on a vertical wall. Moreover, the top end of the support member 65 may include a gooseneck to further facilitate adjustments to the orientation of the mounting fixture 10.

Figure 5:
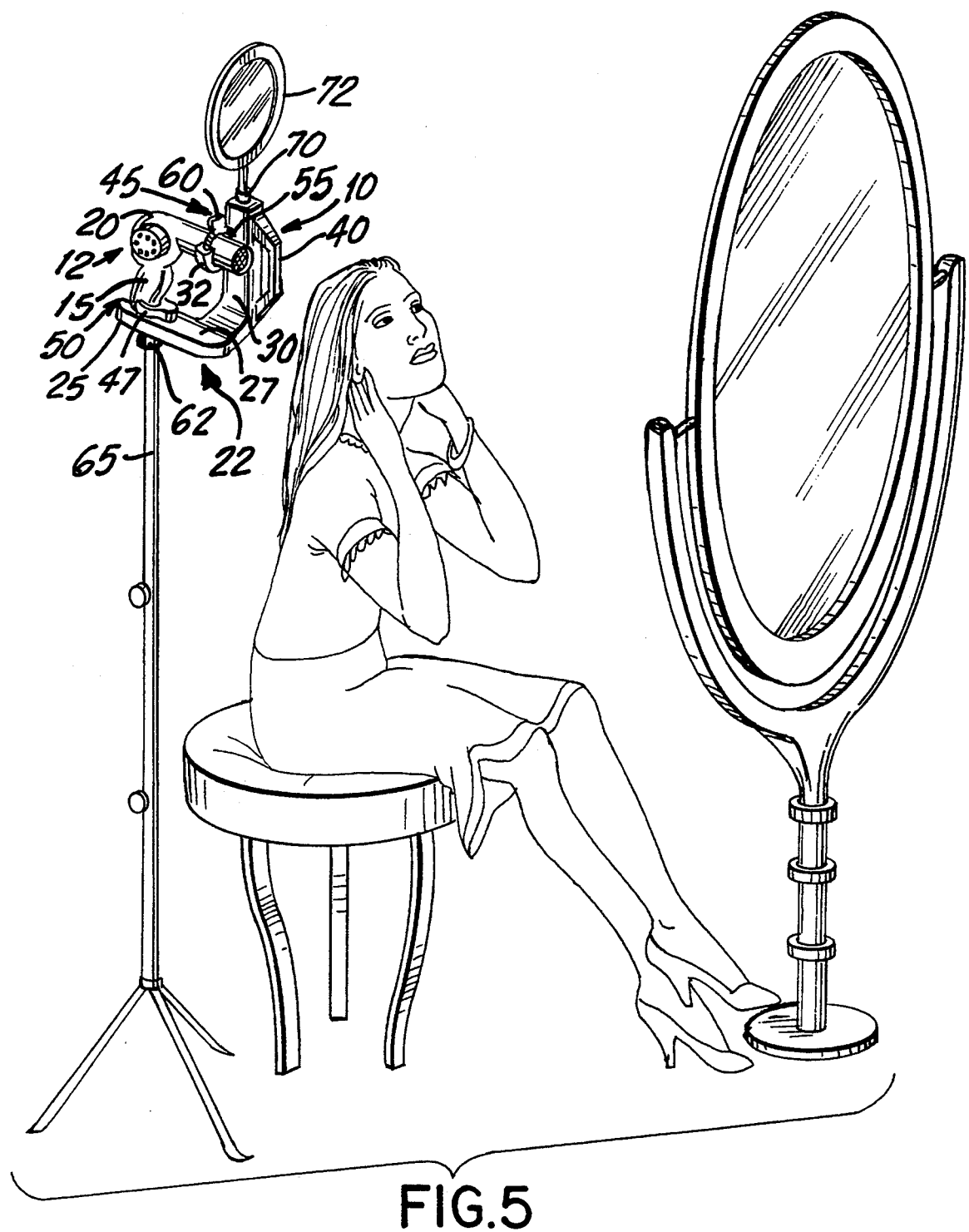
FIG. 5 is a perspective view of the mounting fixture of FIG. 1 showing a mirror mounted on the mounting fixture and the mounting fixture supported on a stand.

FIG. 5 shows the mounting fixture 10 further comprising a means 70 for mounting the handle of a mirror 72 on the upper surface of the arm portion 30. The means 70 for mounting the mirror handle comprises a cylindrical member, having a socket therein, which is attached to the upper surface of the arm portion 30. The handle end of the mirror 72 is inserted into the socket so that the mirror is tightly held in a vertical orientation in the socket.

It is also possible to mount the cylindrical member on the top of a second support member and insert the handle end of the mirror 72 therein. In such an arrangement, the mirror 72 and mounting fixture 10 would be mounted on separate support members.

Figure 6:
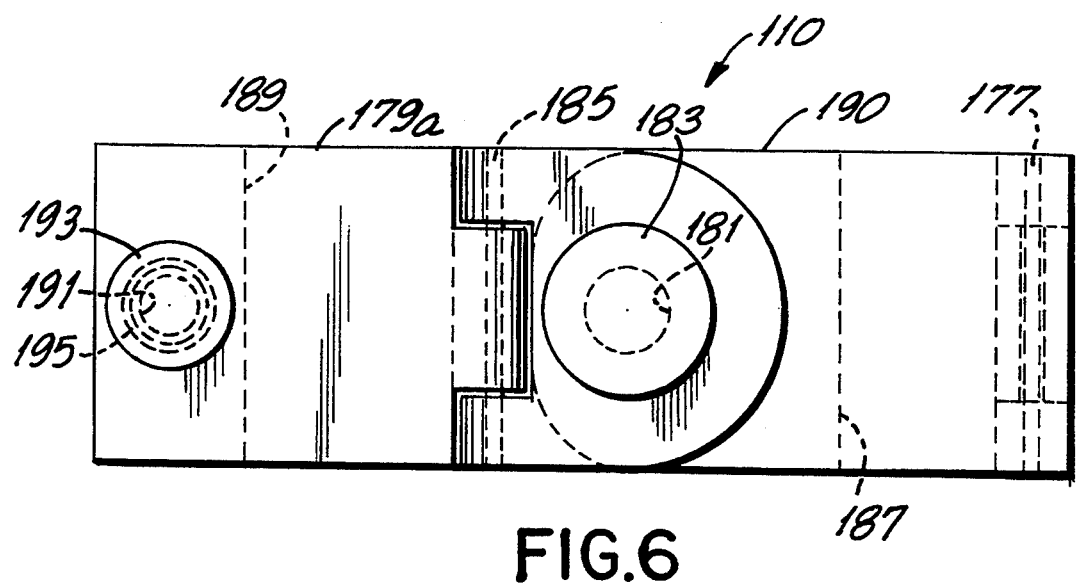
FIG. 6 is a side elevation of a second embodiment of the present invention showing the first and second pairs of arms, and the second hinge formed in one of the second arms.
Figure 7:
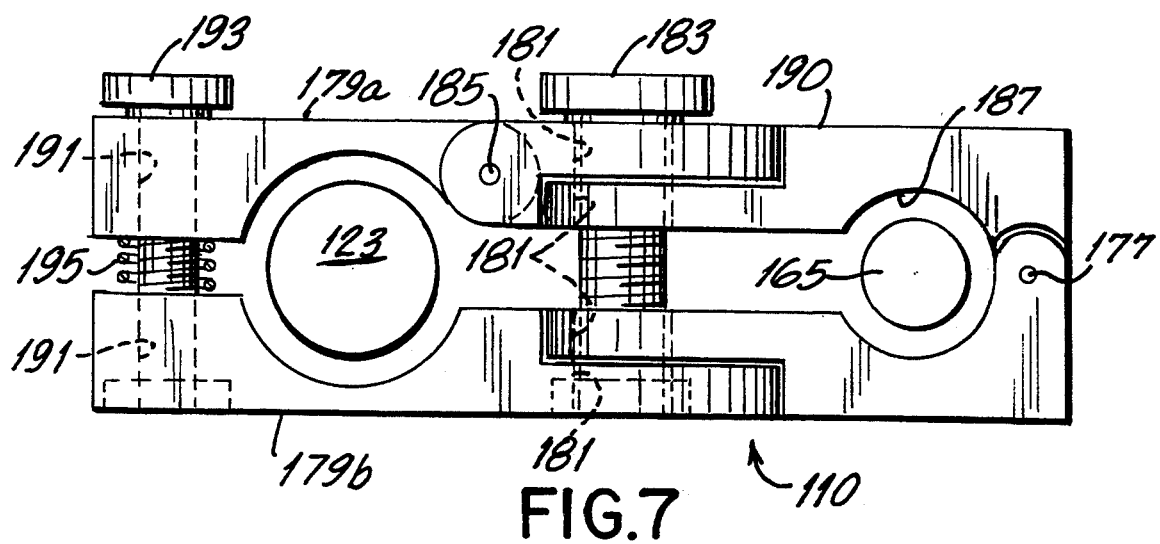
FIG. 7 is a bottom plan view of the mounting fixture of FIG. 6.

FIGS. 6 and 7 show a second embodiment of the mounting fixture 110. Parts in FIGS. 6 and 7 corresponding to parts in FIGS. 1-5 are identified by the same reference numeral with the addition of the prefix 100. Briefly, the mounting fixture 110 comprises a first pair of arms 175 connected together at one end by a first hinge 177 enabling the first pair of arms to grasp the support member 165. A second pair of arms 179a,b sandwiches the first pair of arms 175 at the end opposite from the first hinge 177.

The sandwiched portions of the first pair of arms 175 and the sandwiching portions of the second pair of arms 179a,b each have a linking bore 181 coaxially aligned with the other linking bores. A linking bolt 183 extends through the linking bores 181 to clamp the first and second pairs of arms 175, 179a,b together thereby to clamp the first pair of arms 175 around the support member 165 and to enable adjustable inclination of the second pair of arms 179a,b with respect to the plane which contains the first pair of arms.

A second hinge 185 is formed in one of the second arms 179a enabling the one of the second pair of arms to be swung between open and closed positions enabling the second pair of arms 179a,b to grasp the dryer handle 115.

More specifically, the internal surfaces of the first pair of arms 175 have opposing semicircular recesses 187 enabling the arms to grasp the support member 165 when they are swung together. The second pair of arms 179a,b similarly have opposing semicircular recesses 189. The second hinge 185 enables adjustment of the size of the opening defined by the semicircular recesses 189 enabling the second pair of arms 179a,b to grasp dryer handles 115 of different sizes.

The ends of the second pair of arms 179a,b opposite the linking bolt 183 each have a hole 191 wherein the holes 191 are coaxial with respect to one another when the second pair of arms are swung to the closed position. An end bolt 193 extends through the holes 191 to clamp the dryer handle 123 between the second pair of arms 179a,b.

A spring 195 is disposed between the ends of the second pair of arms 179a,b so that the bolt 193 extends through the spring. The spring 195 biases the pivotal arm 179a against the head of the bolt 193. This facilitates clamping of the dryer handle 115 between the second pair of arms 179a,b since the pivotal arm 179a always follows the head of the bolt 193. Separate manipulation of the pivotal arm 179a is therefore unnecessary.

The support member 165 can be supported by a tripod or a base such as those used in floor lamps. Alternatively, the support member 165 can be supported on a vertical wall. Also, the top end of the support member 165 may include a gooseneck to further facilitate adjustments to the orientation of the mounting fixture 110. The top end of the support member 165 may also be adapted to support a hand-held mirror.

While the invention has been described by reference to preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A mounting fixture for a hand-held hair dryer having an elongate dryer handle and barrel extending from a central portion, the dryer handle and barrel having a generally perpendicular orientation with respect to one another, said mounting fixture comprising:

a fixture body including a base portion having a support surface, and an arm portion extending from said support surface in a direction generally perpendicular to said support surface;

a bridge member supported on said arm portion, said bridge member having a longitudinal axis which is generally parallel to said support surface, said bridge member being spaced from said support surface;

a clasp mounted on said support surface and spaced from the longitudinal axis of said bridge member, said clasp being adapted to receive the end of the dryer handle and to impede displacement of the dryer handle relative to said bridge member;

a clamp connected to said bridge member for holding the dryer barrel against the bridge member when the end of the dryer handle is inserted into said clasp; and said base portion having a slot extending in a generally perpendicular direction relative to the longitudinal axis of said bridge member, said clasp being slidably mounted in said slot for translation therein, said clasp being adapted to be secured in a plurality of positions in said slot.

2. A mounting fixture as set forth in claim 1 wherein said clasp has a U-shape, the open end of said clasp facing away from said bridge member.

3. A mounting fixture as set forth in claim 1 wherein said arm portion has a slot, said bridge member being slidably mounted in said slot for translation toward and away from said support surface, said bridge member being adapted to be secured in a plurality of positions in said slot.

4. A mounting fixture for a hand-held hair dryer having an elongate dryer handle and barrel extending from a central portion, the dryer handle and barrel having a generally perpendicular orientation with respect to one another, said mounting fixture comprising:

a fixture body including a base portion having a support surface, and an arm portion extending from said support surface in a direction generally perpendicular to said support surface;

a bridge member supported on said arm portion, said bridge member having a longitudinal axis which is generally parallel to said support surface, said bridge member being spaced from said support surface;

a clasp mounted on said support surface and spaced from the longitudinal axis of said bridge member, said clasp being adapted to receive the end of the dryer handle and to impede displacement of the dryer handle relative to said bridge member;

a clamp connected to said bridge member for holding the dryer barrel against the bridge member when the end of the dryer handle is inserted into said clasp; and said arm portion having a slot, said bridge member being slidably mounted in said slot for translation toward and away from said support surface, said bridge member being adapted to be secured in a plurality of positions in said slot.

5. A mounting fixture as set forth in claim 4 wherein said bridge member is cantilevered from said arm portion.

6. A mounting fixture as set forth in claim 4 wherein said base portion has a slot extending in a generally perpendicular direction relative to the longitudinal axis of said bridge member, said clasp being slidably mounted in said slot for translation therein, said clasp being adapted to be secured in a plurality of positions in said slot.

7. A mounting fixture as set forth in claims 1 or 4 wherein said clamp comprises a resilient strap attached to opposite ends of said bridge member so that, when the dryer barrel is inserted between said strap and bridge member, said strap urges the dryer barrel against said bridge member.

8. A mounting fixture as set forth in claim 7 further comprising an elastomeric sleeve surrounding a portion of said strap which, when said strap holds the dryer barrel against said bridge member, is urged against the dryer barrel by said strap to frictionally resist translation of the dryer barrel relative to said bridge member.

9. A mounting fixture as set forth in claim 8 wherein said elastomeric sleeve includes an integral tab for pulling said strap away from said bridge member.

10. A mounting fixture as set forth in claims 1 or 2 further comprising a pivoting joint on which said base portion is supported, said pivoting joint enabling adjustment of the direction of the dryer barrel mounted on said base portion.

11. A mounting fixture as set forth in claims 1 or 2 wherein said arm portion includes a handle portion.

12. A mounting fixture as set forth in claims 1 or 2 further comprising a means for mounting a mirror on said arm portion.

13. A mounting fixture as set forth in claims 1 or 2 formed by injection molding.

14. A mounting fixture for a hand-held hair dryer comprising:
   a first pair of arms connected together at one end by a first hinge enabling said first pair of arms to grasp a support member;
   a second pair of arms sandwiching said first pair of arms at the end opposite from said first hinge, said sandwiched portions of said first pair of arms and said sandwiching portions of said second pair of arms each having a linking bore coaxially aligned with the other said linking bores;
   a linking bolt extending through said linking bores to clamp said first and second pairs of arms together thereby to clamp said first pair of arms around the support member and to enable adjustable inclination of said second pair of arms with respect to the plane which contains said first pair of arms; and
   a second hinge formed in one of said second arms enabling said one of said second pair of arms to be swung between open and closed positions enabling said second pair of arms to grasp a handle of the hand-held hair dryer.

* * * * *